(12) United States Patent
Shirai et al.

(10) Patent No.: US 6,282,971 B1
(45) Date of Patent: Sep. 4, 2001

(54) BALL SCREW

(75) Inventors: Takeki Shirai; Shigeru Ebina; Ryuji Takeda, all of Tokyo-to (JP)

(73) Assignee: THK Co., Ltd., Tokyo-to (JP)

( * ) Notice: Subject to any disclaimer, the term of this patent is extended or adjusted under 35 U.S.C. 154(b) by 0 days.

(21) Appl. No.: 09/332,110

(22) Filed: Jun. 14, 1999

(30) Foreign Application Priority Data

Jun. 26, 1998 (JP) .................................. 10-180767

(51) Int. Cl.$^7$ .................................. F16H 25/22
(52) U.S. Cl. .................................. 74/424.87
(58) Field of Search .................. 74/459, 89.15, 74/424.8 R, 424.87

(56) References Cited

U.S. PATENT DOCUMENTS

| | | | | |
|---|---|---|---|---|
| 2,780,943 | * | 2/1957 | Stump | 74/459 |
| 4,604,911 | * | 8/1986 | Teramachi | 74/424.8 R |
| 5,063,809 | | 11/1991 | Schlenker | 74/549 |
| 5,303,607 | * | 4/1994 | Katahira | 74/459 |
| 6,089,117 | * | 7/2000 | Ebina et al. | 74/459 |

FOREIGN PATENT DOCUMENTS

| | | |
|---|---|---|
| 0857883A1 | 8/1998 | (EP) . |
| 63-001852 | 1/1988 | (JP) . |
| 5-27408 | 4/1993 | (JP) . |
| WO98/12442 | 3/1998 | (WO) . |

\* cited by examiner

*Primary Examiner*—Richard M. Lorence
(74) *Attorney, Agent, or Firm*—Young & Thompson

(57) ABSTRACT

A ball screw comprises a screw shaft formed on an outer peripheral surface thereof with a spiral ball rolling groove, a nut member having an inner peripheral surface on which a spiral loaded ball rolling groove corresponding to the spiral ball rolling groove of the screw shaft is formed, both the spiral grooves constituting a loaded ball rolling passage in combination thereof when the screw shaft is fitted to the nut member, a number of balls rolling in the loaded ball rolling passage, and a return pipe having one end connected to one end of the loaded ball rolling passage and another end connected to another end of the loaded ball rolling passage so as to scoop the balls rolling in the loaded ball rolling passage at the one end of the return pipe and return the balls to the loaded ball rolling passage at the other one end of the return pipe. Cutouts, each having a width gradually reduced, are formed to both end portions of the return pipe so that the width of the cutout is gradually reduced towards the inside of the return pipe.

3 Claims, 9 Drawing Sheets

BALL SCREW

BACKGROUND OF THE INVENTION

The present invention relates to a ball screw particularly having a structure capable of circulating balls rolling in a loaded rolling passage formed between a screw shaft and a nut member by a return pipe fitted to the nut member.

One known example of such a ball screw is composed of a screw shaft to which a ball rolling groove is formed and a nut member to which a loaded ball rolling groove corresponding to the ball rolling groove formed to the screw shaft. These ball rolling groove and loaded ball rolling groove constitute, in combination, a loaded ball rolling passage in which balls are rolled. One and other ends of the loaded ball rolling passage are connected by a return pipe fitted to the nut member in a manner such that the ball rolling in the loaded ball rolling passage is scooped at the one end thereof by the return pipe and returned to the loaded ball rolling passage at the other end thereof. The ball screw having the above structure is shown, for example, in Japanese Utility Model Laid-open (KOKAI) Publication No. HEI 6-69502.

FIG. 9 shows one known example of the return pipe 1 having both opened ends, to which a pair of tongue pieces 2a, 2b are formed to be fittable into the loaded ball rolling passage. The balls, which have rolled in the loaded ball rolling passage formed to the periphery of the screw shaft, collide with the tongue pieces 2a, 2b and then are scooped thereby so as to be introduced into the return pipe 1. The balls thereafter circulate through the return pipe 1 and then again return to the loaded ball rolling passage. Notches or cutouts 3 are also formed near the tongue pieces 2a, 2b at both the opened ends of the return pipe 1 for preventing the balls from interfering with the ball rolling groove formed to the screw shaft.

However, in recent years, it has been required to carry out a high feed operation of a machine tool or the like mechanism, and hence, to render the ball screw rotate ABL at a high rotating speed. In a case where the ball screw is used with an increased D/N value (which is a value obtained by multiplying a rotating number per one minute of the screw shaft by a rotating diameter of the ball), there are fears such that stress concentration will be liable to occur on root portions of the tongue pieces 2a, 2b due to repeated collision of the balls, which results in metal fatigue at these root portions, which are hence damaged.

SUMMARY OF THE INVENTION

An object of the present invention is to substantially eliminate defects or drawbacks encountered in the prior art mentioned above and to provide a ball screw capable of effectively scooping the balls without forming any specific ball scooping means such as tongue pieces to a return pipe.

This and other objects can be achieved according to the present invention by providing a ball screw comprising:

a screw shaft formed, on an outer peripheral surface thereof, with a spiral ball rolling groove;

a nut member having an inner peripheral surface on which a spiral loaded ball rolling groove corresponding to the spiral ball rolling groove of the screw shaft is formed, both the spiral grooves constituting a loaded ball rolling passage in combination when the screw shaft is fitted to the nut member;

a number of balls rolling in the loaded ball rolling passage; and at least one return pipe having one end connected to one end of the loaded ball rolling passage and another end connected to another end of the loaded ball rolling passage so as to scoop the balls rolling in the loaded ball rolling passage at the one end of the return pipe and return the balls to the loaded ball rolling passage at the another one end of the return pipe, the return pipe having both end portions to which cutouts, each having a width gradually reduced, are formed.

In a preferred embodiment, the return pipe is disposed so that both the end portions thereof accord with a lead angle of the screw shaft. The return pipe is disposed so that both the end portions thereof are directed to a direction tangential to a track of the balls.

The width of the cutout is gradually reduced from the end portion of the return pipe towards the inside thereof.

The return pipe is formed with a pair of guide grooves to the inner surface so as to extend along the axial direction thereof.

According to the present invention of the characters mentioned above, since the cutouts are formed to both the ends of the return pipe so that the width of each cutout is gradually reduced, the balls rolling in the loaded ball rolling passage can be guided by both the sides of the cutout. And the balls guided by both the sides of the cutout are gradually led into the inside of the return pipe. According to this structure, the balls can be scooped smoothly without forming any specific portion for scooping the balls such as tongue pieces as in the conventional structure.

According to the preferred embodiment of the present invention, since both the ends of the return pipe are arranged so as to accord with the lead angle of the screw shaft, the balls can be scooped with the lead angle direction, i.e. ball advancing direction being maintained. It is therefore possible to prevent the strong impact from being applied to the return pipe when the balls are led into the return pipe. The maintenance of the ball advancing direction permits to carry out the smooth scoop of the balls without the balls being displaced to one side of the cutout, and the balls are smoothly scooped in a balanced condition.

Furthermore, since the balls can be scooped by the return pipe in the tangential direction, the balls can be smoothly scooped, thus also reducing the collision impact force to the return pipe.

The nature and further characteristic features of the present invention will be made more clear from the following descriptions made with reference to the accompanying drawings.

DESCRIPTION OF THE PREFERRED EMBODIMENT

Figure 1:
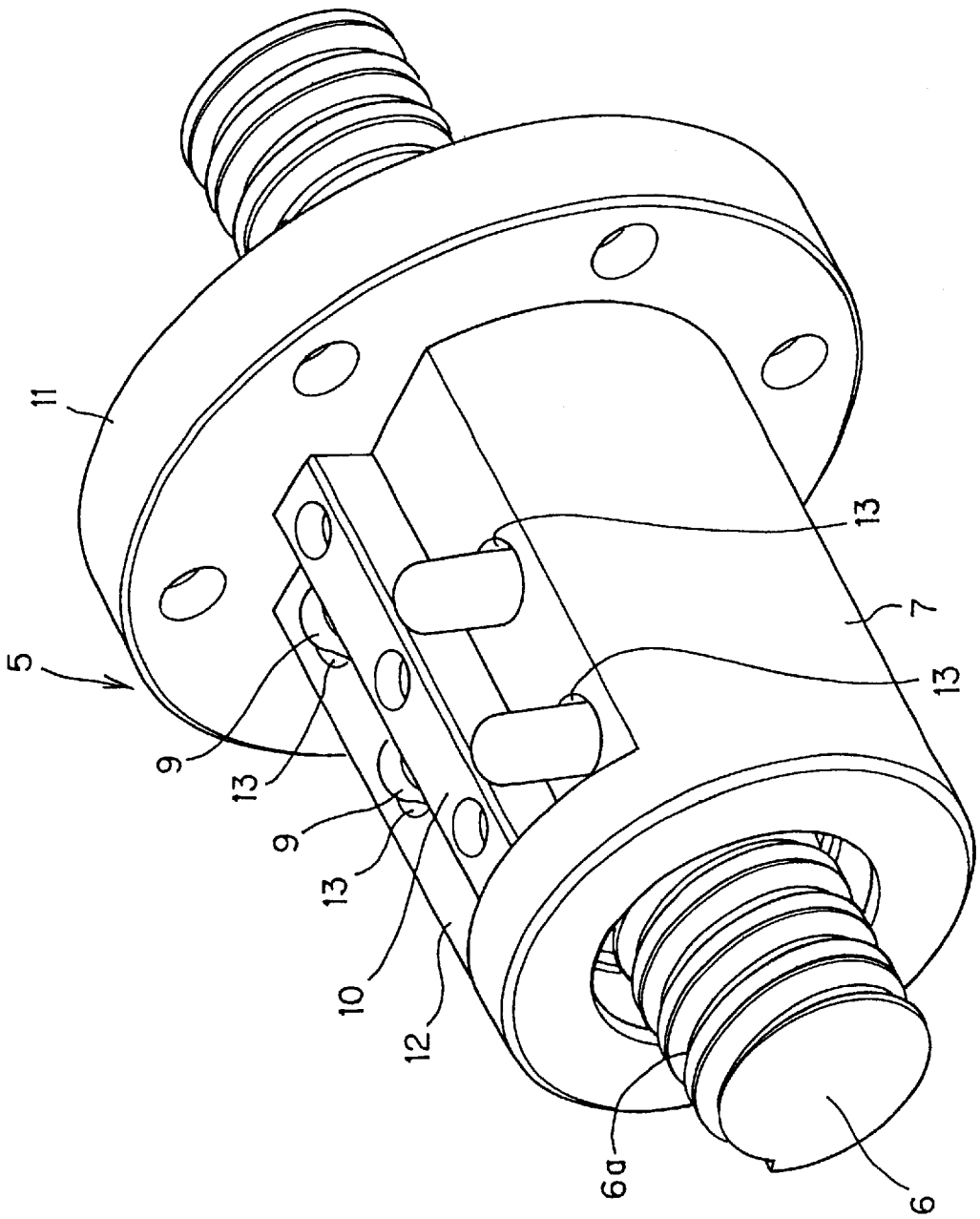
FIG. 1 is a perspective view of a ball screw according to one embodiment of the present invention.
Figure 2:
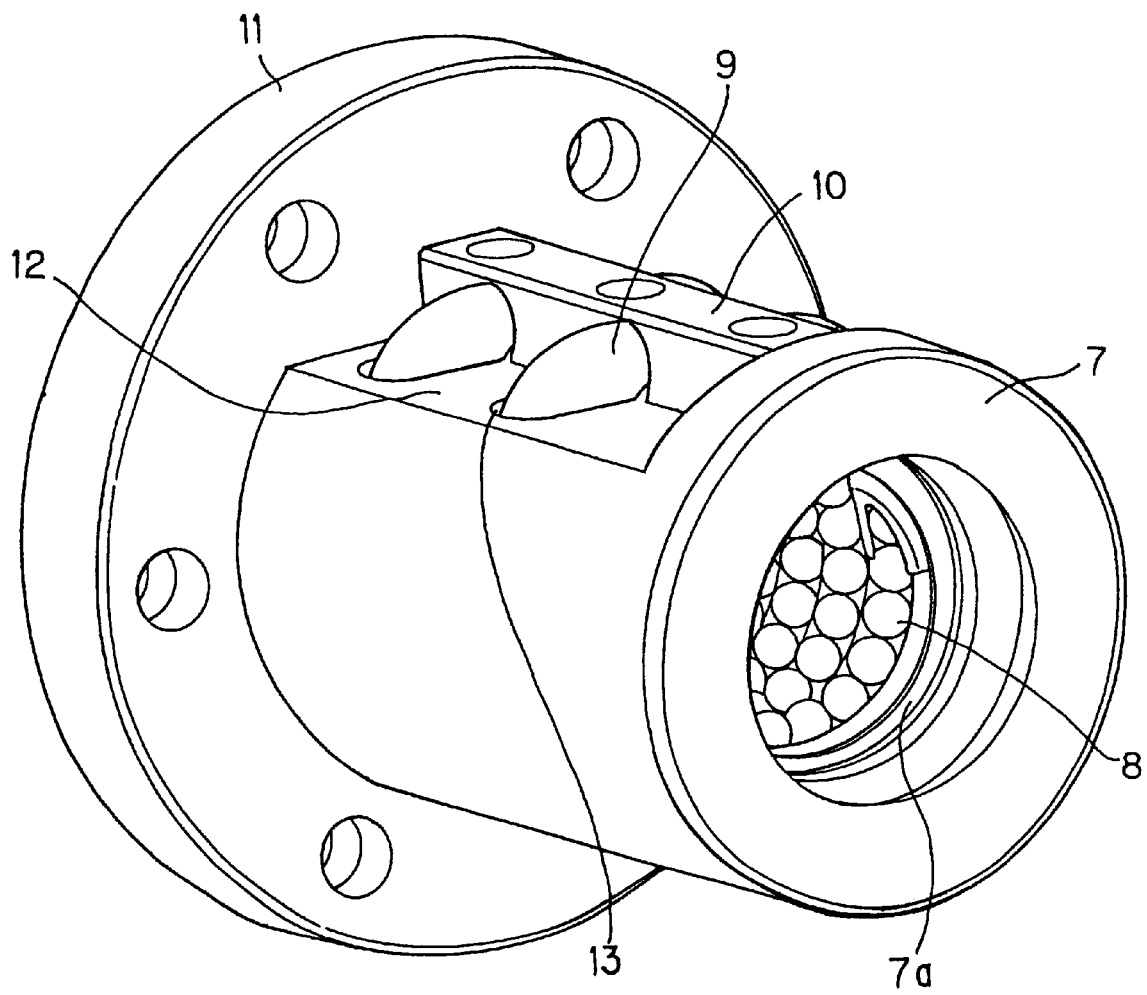
FIG. 2 is a perspective view of a nut member constituting the ball screw of FIG. 1.

FIGS. 1 and 2 show one preferred embodiment of a ball screw 5 according to the present invention. The ball screw 5 is generally composed of a screw shaft 6 having an outer peripheral surface to which a spiral ball rolling groove 6*a* is formed, a nut member 7 having an inner peripheral surface to which a spiral loaded ball rolling groove 7*a* corresponding in arrangement to the ball rolling groove 6*a* of the screw shaft 6, and a number of balls 8, . . . , 8 rolling in a loaded ball rolling passage constituted in combination by the ball rolling groove 6*a* and 7*a*. Two return pipes 9, 9 are fitted to the nut member 7, and the return pipes 9, 9 are arranged so as to connect one and the other ends of the loaded ball rolling passage thereby to constitute a non-loaded return passage. Both end portions of each of the return pipe 9 are bent and fitted in the loaded ball rolling passage with an interval of several pitches. The return pipes 9, 9 are secured to the nut member 7 by means of pipe holder 10.

The ball rolling groove 6*a* is formed to the outer peripheral surface of the screw shaft 6 by a grinding working or rolling working so as to provide substantially a semi-circular cross section in a continuous spiral shape having a constant lead.

The nut member 7 has substantially a cylindrical shape having an inner hollow portion and is provided, at its one end face, with a flange 11 for mounting the ball screw to a machine or like. The loaded ball rolling groove 7*a* formed to the inner surface of the nut member 7, the loaded ball rolling groove 7*a* having substantially a semi-circular cross section corresponding to the ball rolling groove 6*a* of the screw shaft 6 when the screw shaft 6 is fitted to the nut member 7. The nut member 7 formed with an upper flat portion 12, as viewed in FIG. 1 or 2, to which four return pipe fitting holes 13, 13, 13, 13 are formed so as to extend towards the loaded ball rolling groove 7*a* formed to the inner surface of the nut member 7. Both the end portions of the respective return pipes 9, 9 are inserted through these return pipe fitting holes 13, 13, 13, 13.

Figure 3:
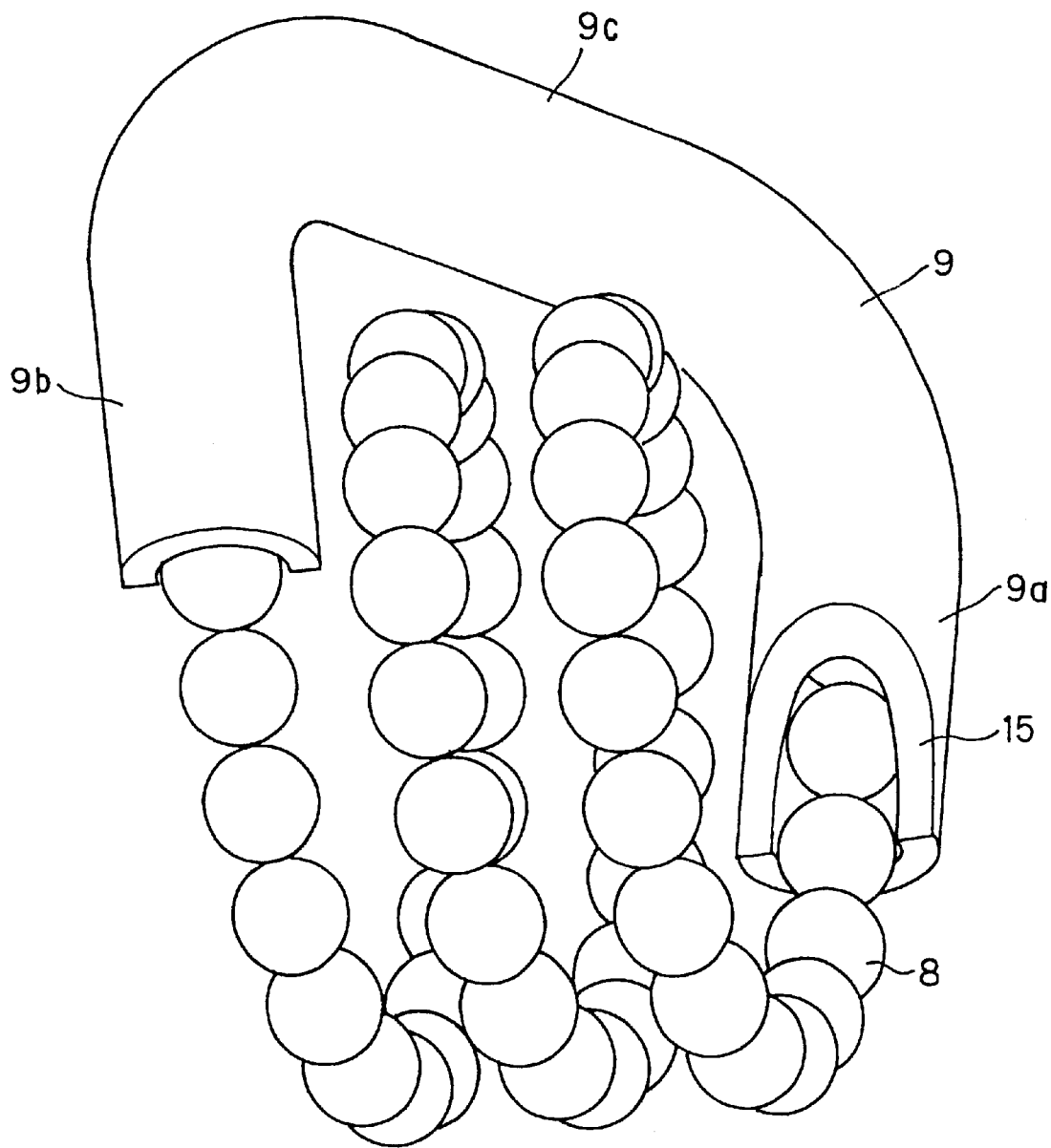
FIG. 3 is a perspective view of one example of a return pipe of the ball screw of FIG. 1.
Figure 4:
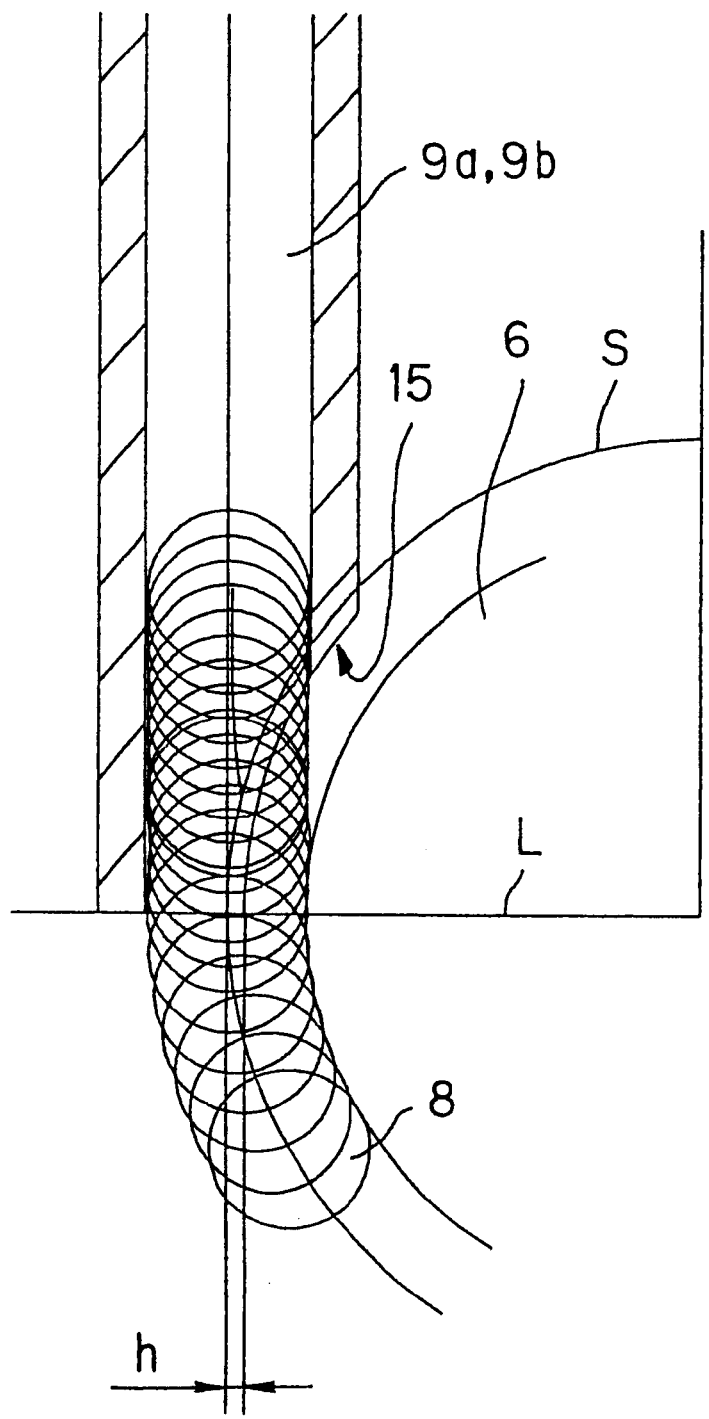
FIG. 4 is a view showing a ball scooping operation by the return pipe.
Figure 5:
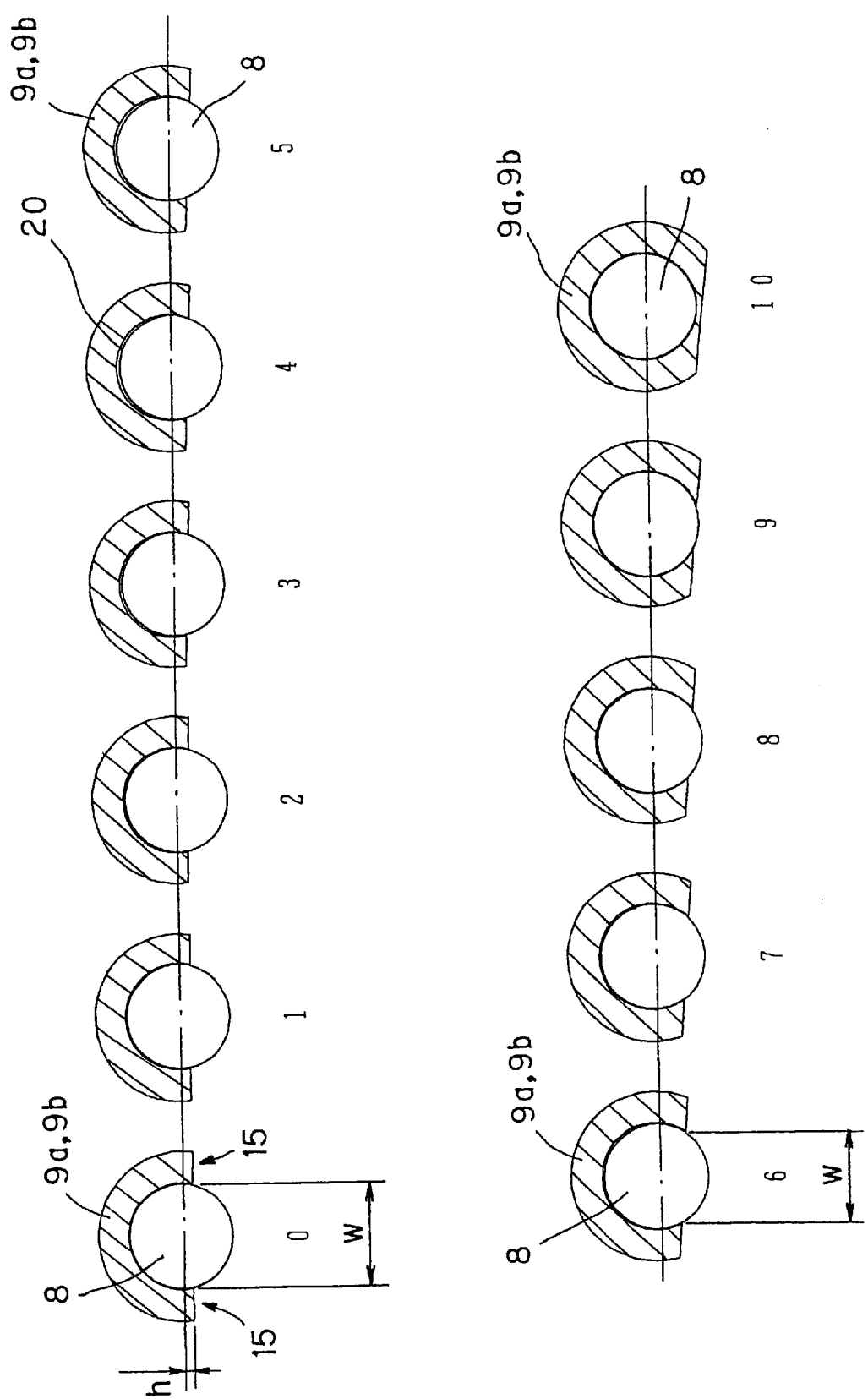
FIG. 5 includes several views showing variation of cross sectional area of the return pipe.

FIGS. 3 to 5 show the details of the return pipe 9. First, as shown in FIG. 3, the return pipe 9 has a circular cross section and both the end portions of the return pipe 9 are bent. That is, the return pipe 9 is composed of a pair of bent leg portions 9*a*, 9*b* and a central horizontal portion 9*c* connecting both the leg portions so as to provide approximately a ⊐-shape in the entire length. The cross sectional shape of the return pipe 9 is not limited to the circular shape and other shapes such as triangular, rectangular or other non-circular cross sectional shape as far as the cross section has an area or size capable of passing the balls and storing a lubricating material or agent. Both the end portions of the leg portions 9*a*, 9*b* are formed with cutout portions (cutouts hereinlater) 15, respectively, so that each cutout provides an arch shape having a horizontal width gradually reduced towards the inside of the return pipe 9.

As shown in FIG. 4, the leg portion 9*a* (9*b*) is disposed in a direction tangential to the track center line S of the balls 8, . . . , 8 and the front end of the leg portion 9*a* (9*b*) extends to a position of the horizontal plane L of the axis of the screw shaft 6. The cutouts 15 of the leg portions 9*a*, 9*b* are formed to be positioned slightly inside the track center line S of the balls 8, . . . , 8. The distal (front) end of the cutout 15 is positioned slightly inside, by an amount of h, the center line D of the leg portion 9*a* (9*b*).

FIG. 5 includes several views showing the variation of the cross sectional shape of the leg portion 9*a* (9*b*), in which the cross sectional shape of the leg portion 9*a* (9*b*) is represented by the numeral "0" at its front end portion and the cross sectional shape thereof changes so as to be represented by the numerals "1" to "9" respectively towards the upper portion of the leg portion, i.e. towards the horizontal portion 9*c* of the return pipe 9 from the opened end thereof. That is, at the "0" portion, the sectional shape has a semi-circular shape having both side ends slightly projecting over the center line D of the return pipe 9 by the amount of h. This sectional shape approaches circular sectional shape towards the upper portion of the leg portion 9*a* (9*b*) and the width W (i.e. width of the cut opening of the leg portion in cross section) between both the cut side ends of the cutout 15 is gradually reduced.

Figure 9:
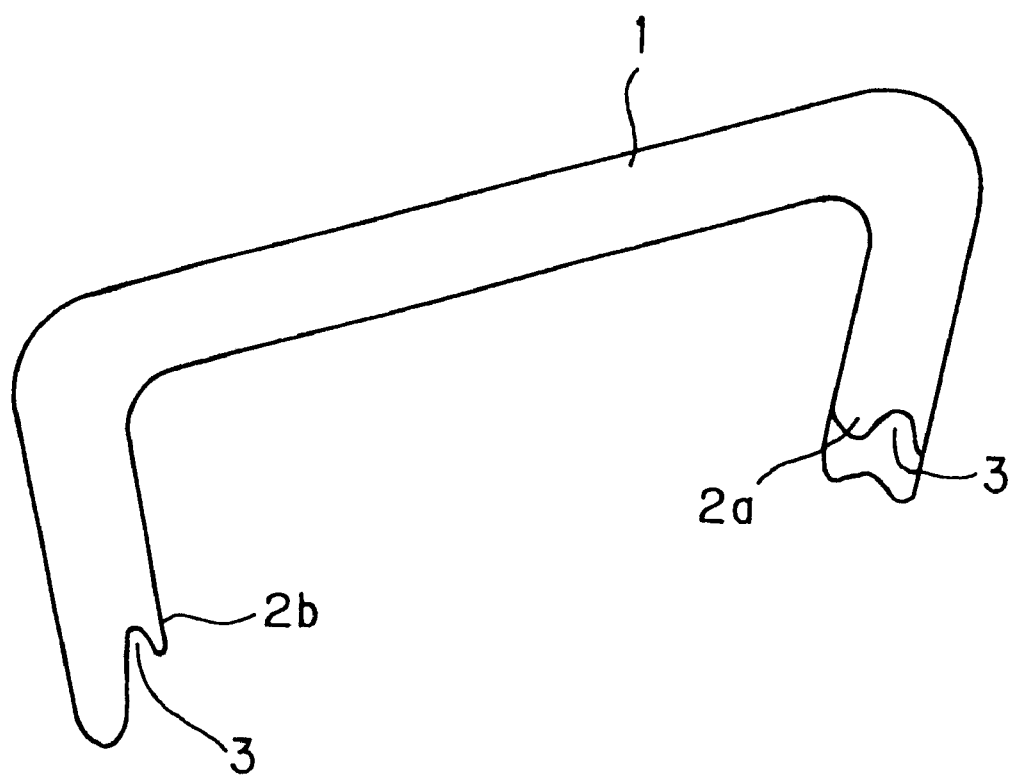
FIG. 9 is a perspective view of a return pipe having a conventional structure.

With reference to FIG. 4, the balls 8, . . . , 8 are rolled on the outer peripheral surface of the screw shaft 6, then rolled at the upper portion over the horizontal plane L of the axis of the screw shaft 6 and then rolled into the inside of the leg portions 9*a*, 9*b*. As shown in FIG. 5, the width W between both the side ends of the cutout 15 is larger than the diameter of the ball 8 at the cross sectional positions "0" to "4", and accordingly, the balls 8, . . . , 8 roll on the outer periphery of the screw shaft 6 without being guided by both the side ends of the cutout 15. As the ball 8 rolls towards the position "4" from the position "0", a gap 20 between the inner peripheral surface of the leg portion 9*a* (9*b*) and the back surface (inside surface) of the ball 8 is gradually increased. When the ball 8 further rolls and reaches the position "5", the ball 8 starts to be guided by both the ends of the cutout 15, and since the width W is gradually reduced towards the upper portion of the return pipe 9 (that is, from the opened front end to the horizontal portion 9*c* side (inside) of the leg portion of the return pipe 9), the balls 8, . . . , 8 are rolled into the return pipe 9 while being guided by both the side ends of the cutout 15 from the sectional shape position "6" to the sectional shape position "10". According to the structure of the cutout 15 having cut side ends of the width W which is gradually reduced towards the upper portion of the leg portion 9*a* (9*b*) of the return pipe 9, the balls 8, . . . , 8 can be scooped by both the side ends of the cutout 15 without forming any tongue piece to the leg portion as in the conventional structure shown in FIG. 9. Therefore, the ball screw 5 can be rotated at a high speed with an increased D/N value.

Furthermore, according to the present embodiment, since the leg portions 9*a*, 9*b* are arranged in the direction tangential to the track center line S of the balls 8, . . . , 8, the balls can be smoothly and effectively scooped along the motion direction thereof by the leg portions 9*a* (9*b*). Thus, the balls 8, . . . , 8 can be scooped without being abruptly changed in the rolling direction, so that the impact force caused at the ball scooping time by the leg portions 9*a*, 9*b* of the return pipe 9 can be effectively reduced.

Figure 6:
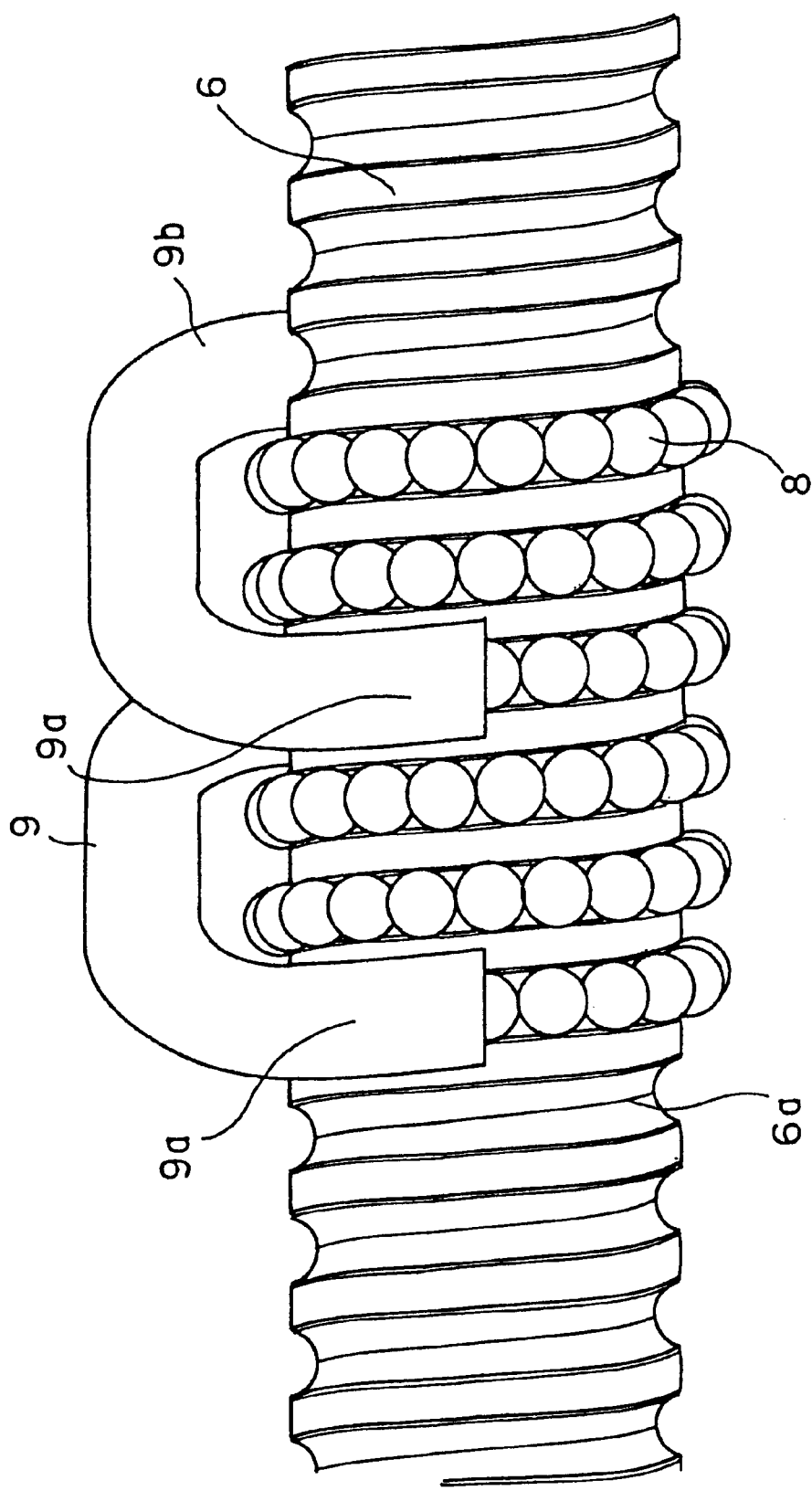
FIG. 6 is a side view, in an enlarged scale, of the return pipe and the screw shaft in assembly.

FIG. 6 shows the relative arrangement of the screw shaft 6 and the return pipe 9, in which the leg portions 9*a*, 9*b* of the return pipe 9 are inclined so as to accord with the lead angle of the screw shaft 6. According to this arrangement, the balls 8, . . . , 8 are scooped by the leg portions 9*a*, 9*b* with the lead angle direction, i.e. ball advancing direction, of the screw shaft 6 being maintained. Accordingly, it is not necessary for the balls to be changed in their rolling direction in the leg portions 9*a*, 9*b*, thus preventing the strong collision impact force from being applied. Furthermore, since the balls 8, . . . , 8 can be scooped by the leg portions 9*a*, 9*b* with the ball advancing direction being maintained, the balls are never displaced to one side of the cutout 15 and hence can be scooped in a good balanced condition.

Figure 7:
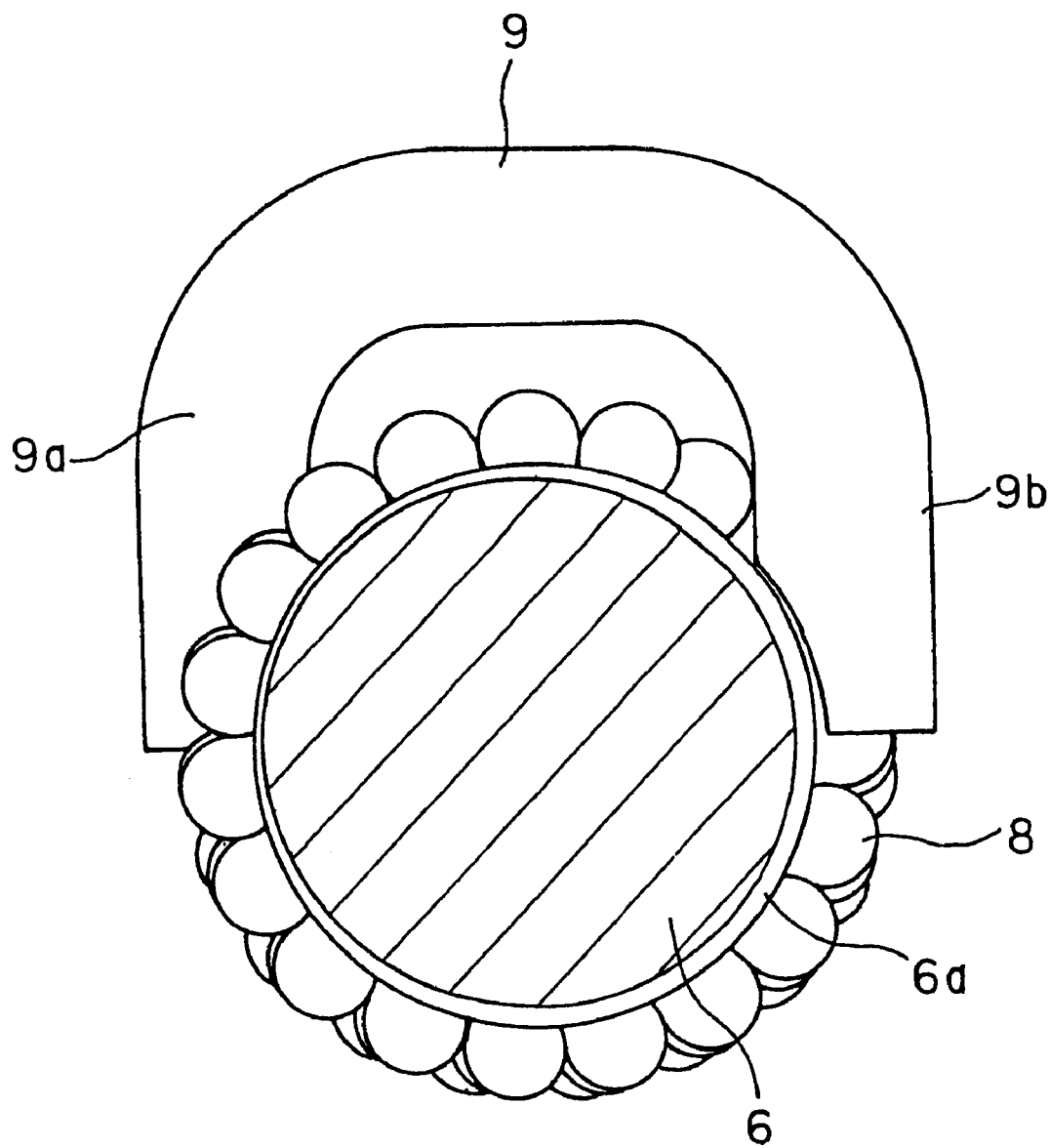
FIG. 7 is a sectional view of the return pipe and the screw shaft in assembly.

As shown in FIGS. 6 and 7, when the screw shaft 6 is rotated, the balls 8, . . . , 8 rolling in the ball rolling groove 6a of the screw shaft 6 in the peripheral direction thereof with the axial load being applied can be scooped by the front end portion of the leg portion 9a, and the balls thus scooped circulate through the return pipe 9. Thereafter, the balls 8, . . . , 8 are returned again to the ball rolling groove 6a from the leg portion 9b disposed apart from the leg portion 9a by several pitches and then circulate through the ball rolling groove 6a.

Figure 8:
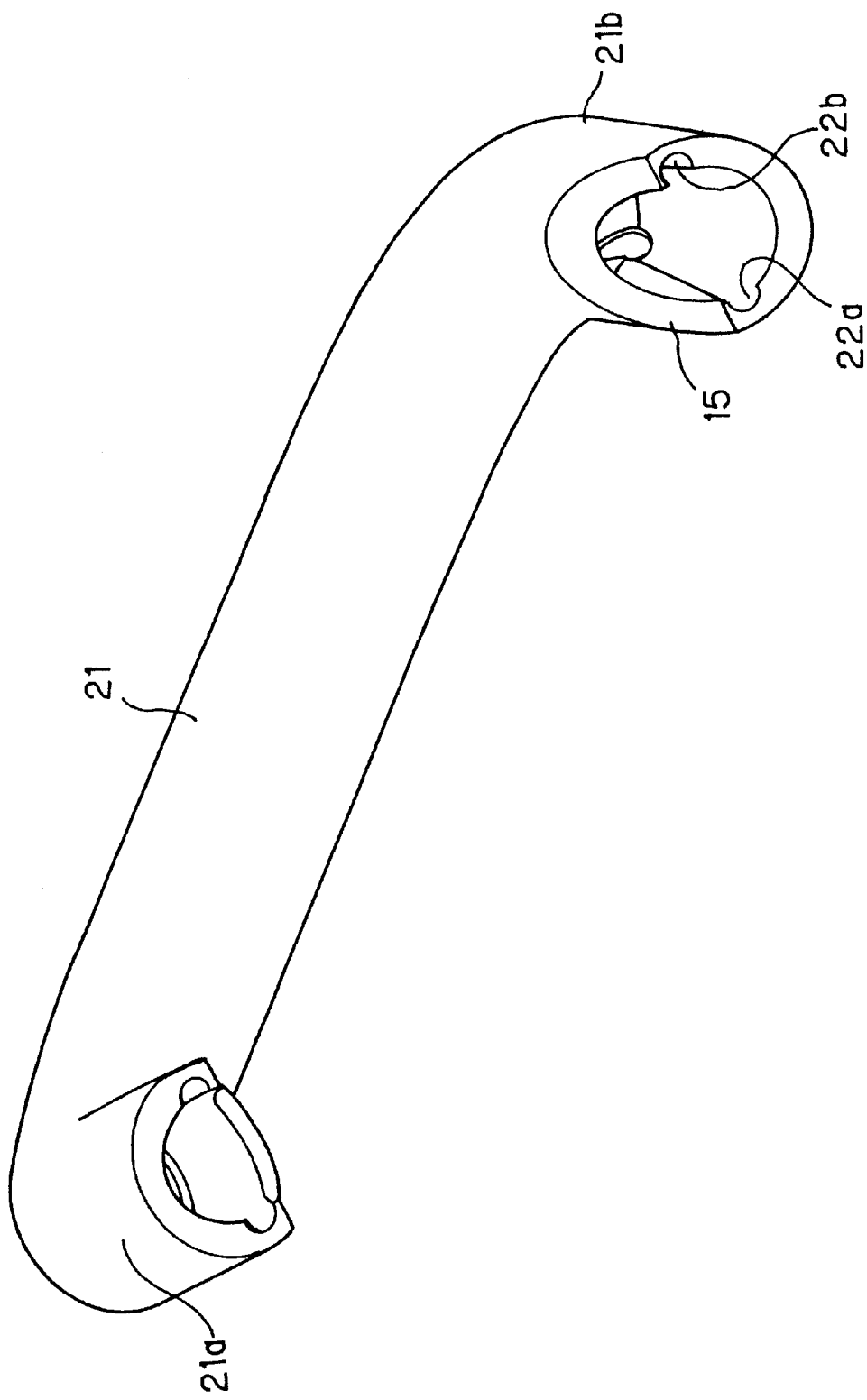
FIG. 8 is a perspective view of another example of the return pipe according to the present invention.

FIG. 8 shows a perspective view of another example of the return pipe 21 according to the present invention. With reference to FIG. 8, the return pipe 21 has leg portions 21a, 21b which are formed with cutouts 15 as in the return pipe 9 of the former example. This cutout 15 has a horizontal width which is gradually reduced towards the inside of the return pipe 9. A pair of guide grooves 22a, 22b are formed to the inner surface of the return pipe 9 so as to extend in the entire axial direction thereof. In a certain arrangement, the balls 8, . . . , 8 may be supported by a belt-shaped retainer with a predetermined distance to be rotatable and slidable for preventing mutual friction of the balls. In such arrangement, both side edges of the retainer may be guided by forming the above-mentioned paired guide grooves 22a, 22b. In a case where the balls 8, . . . , 8 are supported by means of the retainer, the retainer can act so as to pull up the balls in addition to the ball scooping operation of the cutout 15.

As mentioned hereinabove, according to the present invention, since the cutouts are formed to both the end portions of the return pipe in a manner such that the width of the opening of both the side ends of the cutout is gradually reduced towards the inside of the return pipe, the balls rolling in the loaded ball rolling passage can be guided into the return pipe while being guided by both the side ends of the cutout 15 having the reduced width. Accordingly, the balls can be smoothly scooped without forming any specific ball scooping means such as tongue piece as in the conventional structure, and hence, the ball screw can be used with the increased D/N value.

It is to be noted that the present invention is not limited to the described embodiment and other changes or modifications may be made without departing from the scopes of the appended claims.

What is claimed is:

1. A ball screw comprising:

a screw shaft formed, on an outer peripheral surface thereof, with a spiral ball rolling groove;

a nut member having an inner peripheral surface on which a spiral loaded ball rolling groove corresponding to said spiral ball rolling groove of the screw shaft is formed, said both spiral grooves constituting a loaded ball rolling passage in combination when said screw shaft is fitted to said nut member;

a number of balls rolling in the loaded ball rolling passage; and at least one return pipe having one end connected to one end of the loaded ball rolling passage and another end connected to another end of the loaded ball rolling passage so as to scoop the balls rolling in the loaded ball rolling passage at the one end of the return pipe and return the balls to the loaded ball rolling passage at the another one end of the return pipe, said return pipe having both opened end portions in which cutouts, each having a width gradually reduced towards inside the return pipe, are formed, said balls being guided by both sides of said cutouts and being gradually led into the inside of the return pipe, wherein said return pipe is arranged so that center lines of both the opened end portions of the return pipe are substantially tangential to a track center line of the balls, and said one end of the return pipe encloses the ball about a circular path of more than 180° of arc at a point tangential to the track center line of the balls, said one end of the return pipe extending within said track center line at both ends of said circular path.

2. A ball screw as claimed in claim 1, wherein said cutouts are positioned slightly inside said track center line of said balls.

3. A ball screw as claimed in claim 1, wherein said return pipe is formed, on an inner surface thereof, with a pair of guide grooves that extend along the axial direction thereof.

* * * * *